(12) United States Patent
Blackburn et al.

(10) Patent No.: US 6,732,592 B1
(45) Date of Patent: May 11, 2004

(54) SEAT BELT TENSION SENSOR PACKAGE

(75) Inventors: Brian K. Blackburn, Rochester, MI (US); Louis R. Brown, Oxford, MI (US); Edward James Burley, Troy, MI (US)

(73) Assignee: BGM Engineering, Inc., Shelby Township, MI (US)

( * ) Notice: Subject to any disclaimer, the term of this patent is extended or adjusted under 35 U.S.C. 154(b) by 19 days.

(21) Appl. No.: 10/094,842

(22) Filed: Mar. 8, 2002

Related U.S. Application Data

(60) Provisional application No. 60/334,772, filed on Oct. 31, 2001.

(51) Int. Cl.[7] .................................................. G01N 3/08
(52) U.S. Cl. ........................................... 73/826; 73/828
(58) Field of Search ........................ 73/826, 828, 760, 73/862.381, 862.391, 862.392, 862.473, 862.451

(56) References Cited

U.S. PATENT DOCUMENTS

| | | |
|---|---|---|
| 3,698,244 A | 10/1972 | Deming |
| 4,597,297 A * | 7/1986 | Smith ................... 73/862.473 |
| 5,181,739 A | 1/1993 | Bauer et al. |
| 5,257,549 A | 11/1993 | Mole |
| 5,454,591 A | 10/1995 | Mazur et al. |
| 5,483,842 A | 1/1996 | Foreman |
| 5,661,245 A | 8/1997 | Svoboda et al. |
| 5,683,103 A | 11/1997 | Blackburn et al. |
| 5,692,580 A | 12/1997 | Maiwald et al. |
| 5,996,421 A | 12/1999 | Husby |
| 6,081,759 A | 6/2000 | Husby et al. |
| 6,209,915 B1 | 4/2001 | Blakesley |
| 6,260,879 B1 | 7/2001 | Stanley |
| 6,405,607 B2 | 6/2002 | Faigle et al. |
| 6,447,010 B1 | 9/2002 | Curtis et al. |
| 6,450,534 B1 | 9/2002 | Blakesley et al. |

* cited by examiner

*Primary Examiner*—Edward Lefkowitz
*Assistant Examiner*—Jermaine Jenkins
(74) *Attorney, Agent, or Firm*—Irell & Manella LLP

(57) ABSTRACT

A sensor package which is reliable, low cost, simple, robust, and usable to input additional seat occupant information to an airbag controller to control airbag deployment, and which is insensitive to cross axis loading of a seat belt. A second housing member is internally interfaced with the first housing member, wherein a suspension system frictionlessly suspends the first housing member springably with respect to the second housing member. A pressure sensor is mounted to one of the first and second housings, and a biasing spring is mounted to the other of the first and second housings in axial abutment with the pressure sensor.

17 Claims, 4 Drawing Sheets

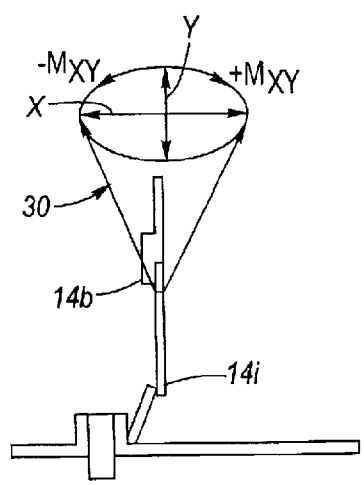 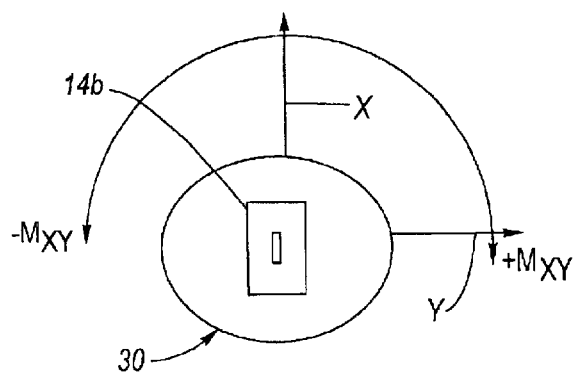
Fig. 3A    Fig. 3B
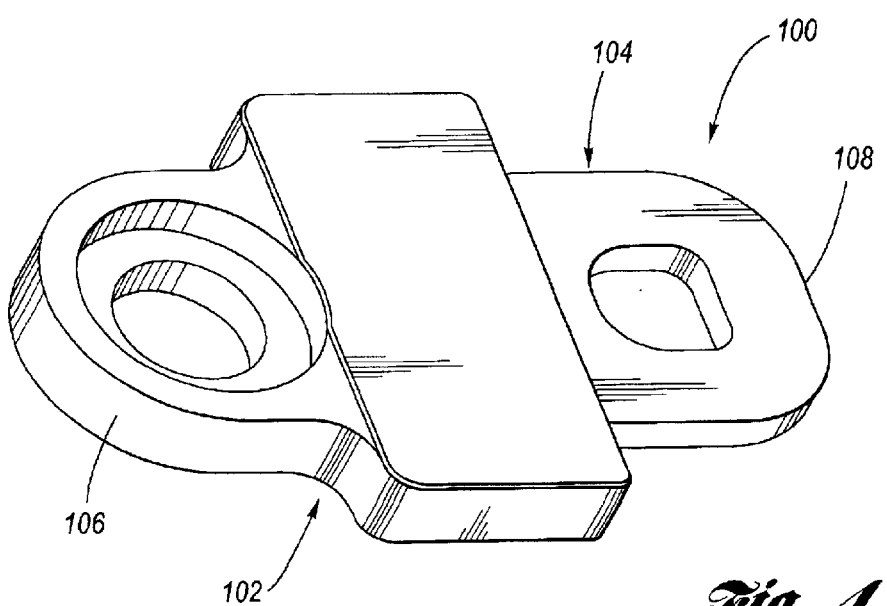
Fig. 4
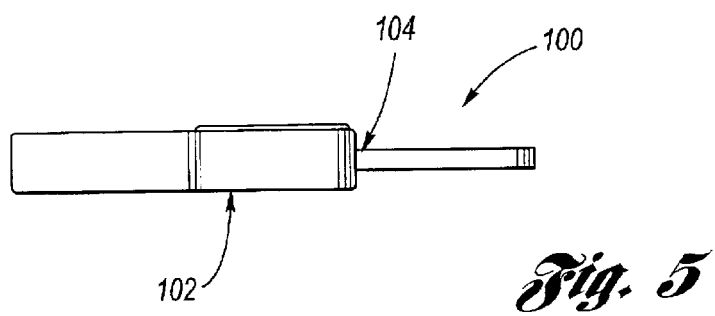
Fig. 5

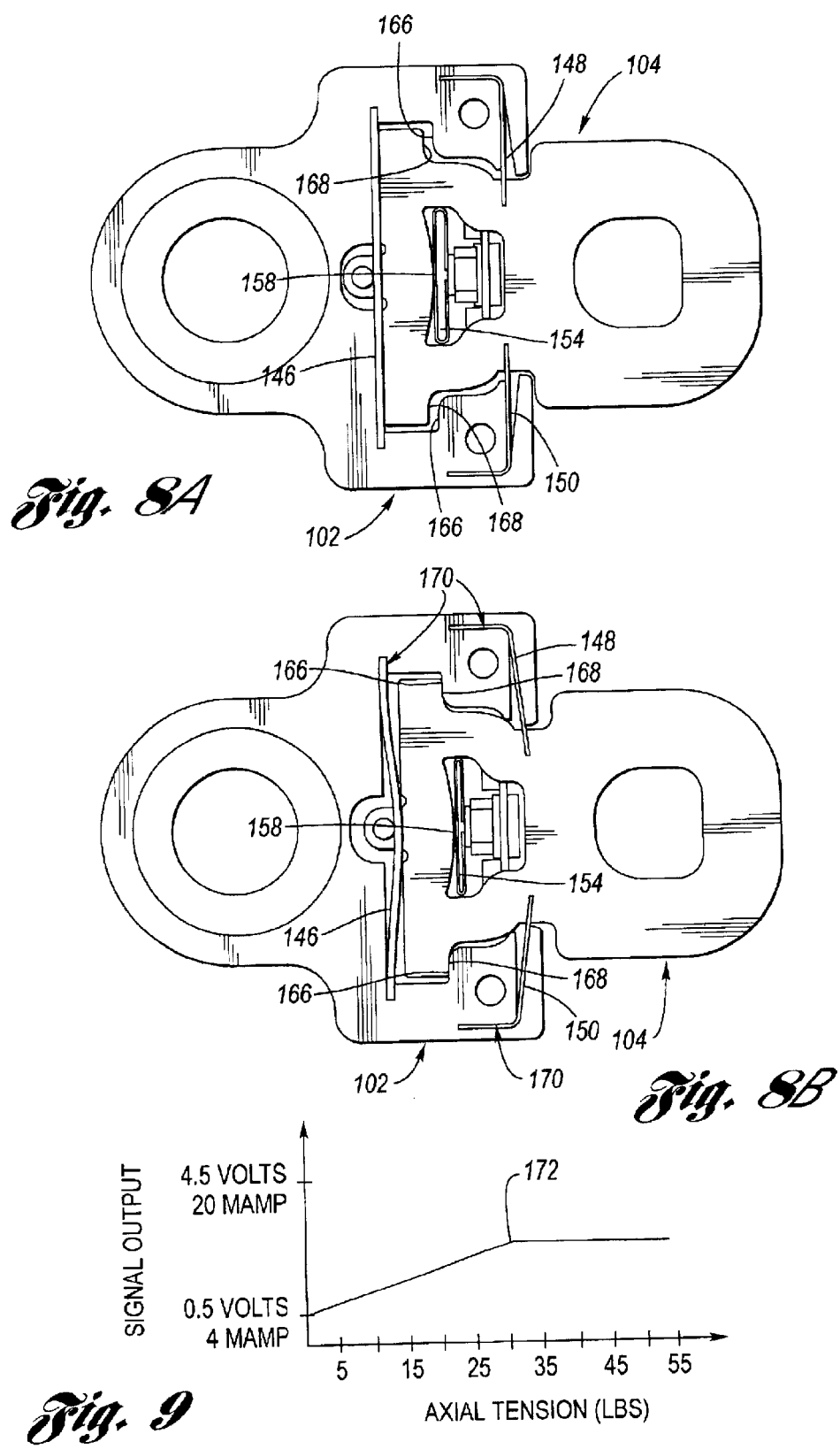

SEAT BELT TENSION SENSOR PACKAGE

CROSS-REFERENCE TO RELATED APPLICATIONS

The present application is a continuation of provisional patent application No. 60/334,772, filed Oct. 31, 2001, which is presently pending.

BACKGROUND OF THE INVENTION

1. Field of the Invention

The present invention relates to an automobile sensor package for detecting the magnitude of a tensile force in a seat belt used in a car seat, and in particular to a sensor package that can detect the magnitude of tension in a seat belt and provide an electrical signal that is representative of the magnitude of the tensile force.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to strain which causes dimensional changes of the resistor.

Many types of strain gauge sensors have been designed and made commercially available. Various strain gauge sensors have proven to be generally satisfactory; however, these have tended to be rather expensive and not suitable in certain applications such as sensing the presence of an occupant in an automobile seat. A sensor suitable for such an application must be compact, robust, impervious to shock and vibration and yet inexpensive. In this regard, a sensor which has promise is described in U.S. Pat. No. 5,661,245 to Svoboda et al, issued Aug. 26, 1997, hereby herein incorporated by reference.

Automobile seats can use sensors to activate air bags, which would be deployed during an accident. Injury to infants or small children from air bag deployment with excessive force is a current industry problem. A weight sensor in the seat can be used to control the deployment force during air bag activation. Unfortunately, however, there are several problems with detecting seat occupant weight. For example, when a seated occupant puts on a seat belt, the force of cinching down the seat belt on the occupant can cause a seat weight sensor to have false and erroneous readings. For another example, if a child's car seat is cinched down tightly in the car seat, it can appear to the weight sensor that a heavy person is in the seat, which is the wrong reading.

An example of a child seat sensing system is schematically depicted at FIG. 1, wherein a child seat 10 is placed upon a front passenger seat 12 and held thereto by a tightened seat belt 14. In this regard by way of example, the seat belt has an outboard portion 14o and an inboard portion 14i which are mutually coupled by a buckle 14b. The inboard portion 14i has a fixed length and is connected via an inboard anchor 16 to a vehicle component, such as for example a floor frame member. The outboard portion 14o is associated with, for example, an outboard anchor 18 which is also connected with a vehicle component. A shoulder belt 26 is associated with the outboard portion 14o, and is, for example, connected to a retractor assembly 22, which is, in turn, connected to a vehicle component. A weight sensor 20 provides a signal to the controller. When a crash is sensed by the crash sensor, the controller manages inflation of the air bag 24 via an air bag actuation circuit. The foregoing sensing scheme is described in detail in U.S. Pat. No. 5,454,591 to Mazur et al, issued Oct. 3, 1995, hereby herein incorporated by reference.

As represented schematically by FIG. 2, a seat belt tension sensor (BTS), which in general is used to measure the seat belt webbing tension, can be packaged in a number of locations. For example, a BTS could be packaged adjacent the outboard anchor 18, adjacent the inboard anchor 16, or somewhere at the buckle 14b. Each location has advantages and disadvantages. The BTS is required to compensate the weight sensing system such that federal government regulation FMVSS 208 may be met. This new regulation requires auto manufacturers to provide an automatic shut off of the passenger side air bag. The weight sensor may make vacover judgments under normal seating conditions. However, when a child seat is placed onto the vehicle seat and the seat belt webbing is used to cinch the child seat in place, a weight error is introduced into the sensing system. By gauging the webbing tension, the weight sensor can correct for the induced error due to the belt webbing so as to ensure the controller correctly determines whether to actuate, or whether to actuate and regulate the inflation force of, an air bag.

It can be seen from FIG. 2 that the seat belt 14 forms a load loop, the origin of which can be considered to be located at the buckle 14b where the latch thereof engages a tongue 14t connected to the end of the outboard portion 14o of the seat belt 14. This area in or near the seat belt buckle is a first possible BTS location. However, a BTS could be placed adjacent the outboard anchor 18. In this case, the rather long length of the outboard portion 14o of the seat belt 14 presents the possibility for a large amount of friction to be present between the buckle and the outboard anchor.

With the foregoing having been said, the aforementioned advantages and disadvantages of BTS location are as follows. With regard to BTS placement adjacent the outboard retractor, advantages include limited cross axis loading variation (discussed hereinbelow), greater amount of room for packaging, and ability to be covered so as to eliminate surface requirements and avoidance of splash and debris contamination; while disadvantages include greater amount of friction from D ring and occupant body friction sources, long distance from critical contact force location (tongue to latch contact location), and specific mounting requirements due to retractor mounting considerations. With regard to BTS placement inboard adjacent the buckle or in the buckle, advantages include the sensor being located close to the contact force of the tongue to latch with a consequent lowest possible system friction therebetween, possibility for integration into the same wiring harness as the buckle switch (one dual sensor assembly), the BTS could replace buckle switch if properly designed, and a low deflection is required due to close contact force proximity (which is a key consideration for reducing hysteresis and repeatability errors); while disadvantages include a high cross axis loading being required due to buckle head flexibility, packaging considerations must include prevention of possible contamination due to socover particles and liquid spills, and packaging may be more difficult due to small size requirement for the buckle area (requiring miniaturization).

Another consideration with respect to BTS placement is cross axis loading. In this regard, it should be appreciated that due to the fixed mounting in an outboard anchor based BTS, there would be limited cross axis loading, but that a buckle based BTS would have a worst case operating cross axis loading. This can be understood from FIGS. 3A and 3B.

FIG. 3A shows the details of the potential for cross axis loading at the buckle, wherein it is assumed that the buckle 14b is located within a cross axis load motion cone 30. The cone 30 is used to define a potential buckle position within or on the cone surface. In the example of FIG. 30A, the cone 30 begins with a cross-section of 24 mm and increases to a cross-section of 100 mm. It should be appreciated that the geometry of the cone 30 should be specifically defined by the seat belt supplier in combination with the seat supplier.

FIG. 3B depicts schematically the nature of the forces involved in cross axis loading. The actual load required to achieve the motion depicted in FIG. 3A may be quite large. The cross axis load motion cone 30 is defined by a forward direction loading force X, an inboard direction loading force Y (which is perpendicular to force X) and a twist moment $\pm M_{xy}$ in the X-Y plane. Table 1 defines the range of cross axis loading motion including buckle twist.

TABLE 1

| Degrees of Freedom | X direction | Y direction | Z direction | Twist |
|---|---|---|---|---|
| Allowed Motion | +/−75 mm | +/−75 mm | Not applicable | +/−90° |
| Allowed Error | +/−3% | +/−3% | Not applicable | +/−3% |

Accordingly a need in the art continues to exist for a reliable, low cost, simple and robust seat belt tension sensor that can be used to input additional seat occupant information to an airbag controller to control airbag deployment, and which is insensitive to cross axis loading.

SUMMARY OF THE INVENTION

The present invention is a seat belt tension sensor package which is reliable, low cost, simple, robust, and usable to input additional seat occupant information to an airbag controller to control airbag deployment, and which is insensitive to cross axis loading.

The seat belt tension sensor package according to the present invention includes a first housing member, a second housing member internally interfaced with the first housing member, a suspension system for frictionlessly suspending the first housing member with respect to the second housing member, a pressure sensor mounted to one of the first and second housings, and a biasing spring mounted to the other of the first and second housings in axial abutment with the pressure sensor.

A seat belt is connected to the first and second housings, wherein tensile force of the seat belt is registered at the pressure sensor. The first and second housings are permitted a predetermined small axial movement, the axial movement being defined between a first relative position and a second relative position. The first relative position is defined by a zero tensile force axially applied to the first and second housings, and the second relative position is defined by a predetermined tensile force axially applied to the first and second housings. The axial movement occurs without scovering friction via the suspension system. Between the first and second relative positions, the axial tensile force applied to the first and second housings is taken by the suspension system and the biasing spring. However, at the second position, all increases in axial tensile force are taken by a mechanical abutment between the first and second housings.

The preferred suspension system utilizes a plurality of leaf springs which are freely flexible in the axial direction but quite inflexible in directions perpendicular thereto. As a result, the suspension system is very resistant to cross axis loading.

Accordingly, it is an object of the present invention to provide a seat belt tension sensor package which is reliable, low cost, simple and robust, and which is usable, for example, to input additional seat occupant information to an airbag controller to control airbag deployment.

It is an additional object of the present invention to provide a seat belt tension sensor package as aforedescribed which is insensitive to cross axis loading.

These, and additional and additional objects, features and advantages of the present invention will become clearer from the following specification of a preferred embodiment.

BRIEF DESCRIPTION OF THE DRAWINGS

FIGS. 3A and 3B schematically depict cross axis loading associated with an automotive seat belt.

FIG. 4 is a perspective elevational view of a seat belt tension sensor package according to the present invention.

FIG. 5 is a side view of the seat belt tension sensor package of FIG. 4.

FIG. 8A is a top view of the seat belt tension sensor package of FIG. 4, wherein the cover is removed, and the first and second housings are at a first relative position.

FIG. 8B is a top view of the seat belt tension sensor package of FIG. 4, wherein the cover is removed, and the first and second housings are at a second relative position.

FIG. 9 is a graph of an example of sensor voltage output relative to seat belt tension.

DETAILED DESCRIPTION OF THE PREFERRED EMBODIMENT

Figure 1:
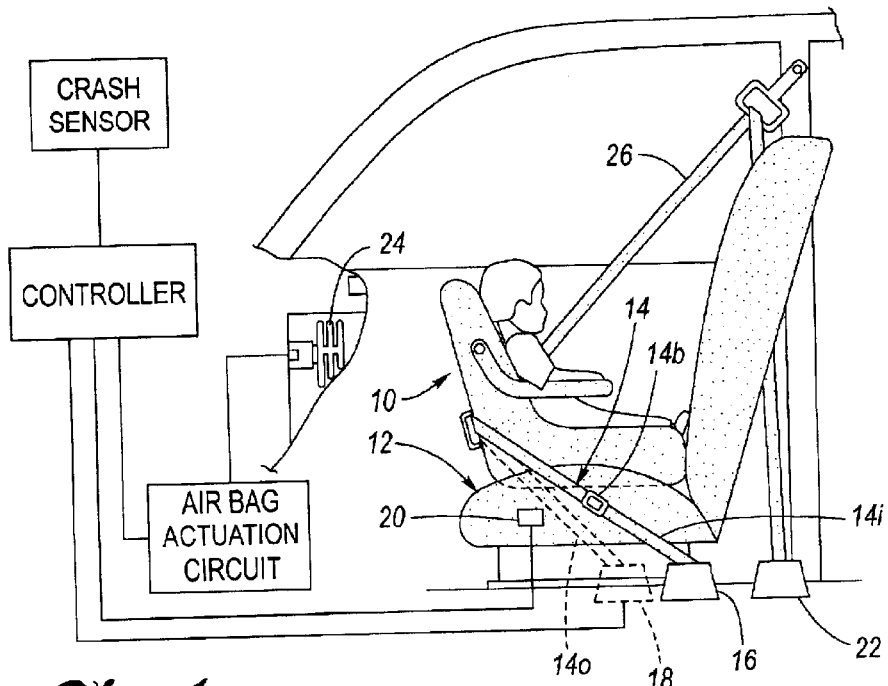
FIG. 1 is a schematic view of an environment of use of the present invention.
Figure 2:
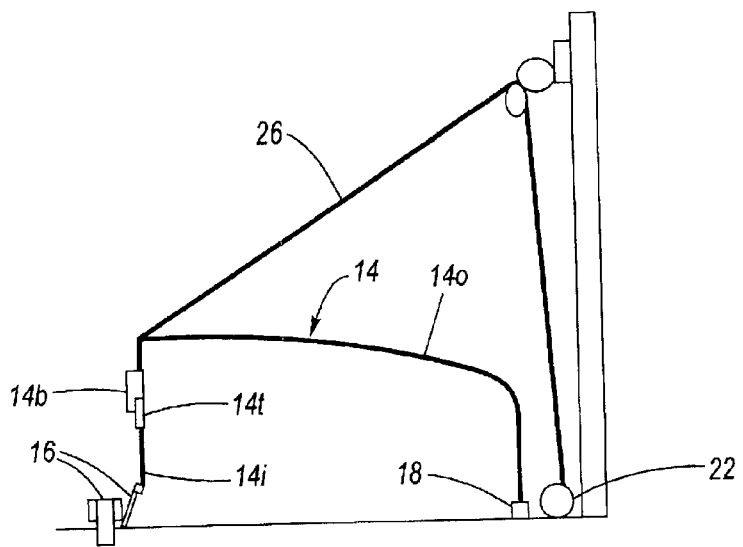
FIG. 2 is a schematic depiction of an automotive seat belt system.

Referring now to the Drawings, FIGS. 4 through 9 depict various aspects of the seat belt tension sensor package 100 according to the present invention. FIGS. 4 and 5 elevationally depict the seat belt tension sensor package 100, which includes a first housing member 102 and a second housing member 104. Each of the first and second housings 102, 104 have respective seat belt attachment features, as for example a fitting 106 connected to the first housing member, and a base 108 connected to the second housing member. The seat belt tension sensor package 100 is placeable anywhere in the seat belt system because of a unique suspension system between the first and second housing members (discussed hereinbelow) which negates the adverse effects of cross axis loading (described hereinabove). It is to be noted that the seat belt tension sensor package has the utility to be located at either an inboard or outboard (inclusive of the buckle) location, wherein a buckle location is preferred.

Figure 6:
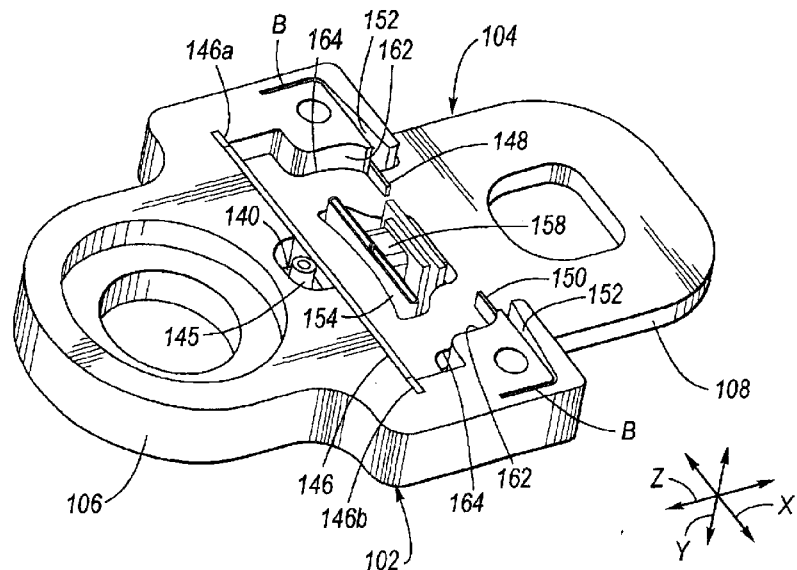
FIG. 6 is a perspective view of the seat belt tension sensor package of FIG. 4, wherein a cover thereof has been removed to show internal components.
Figure 7:
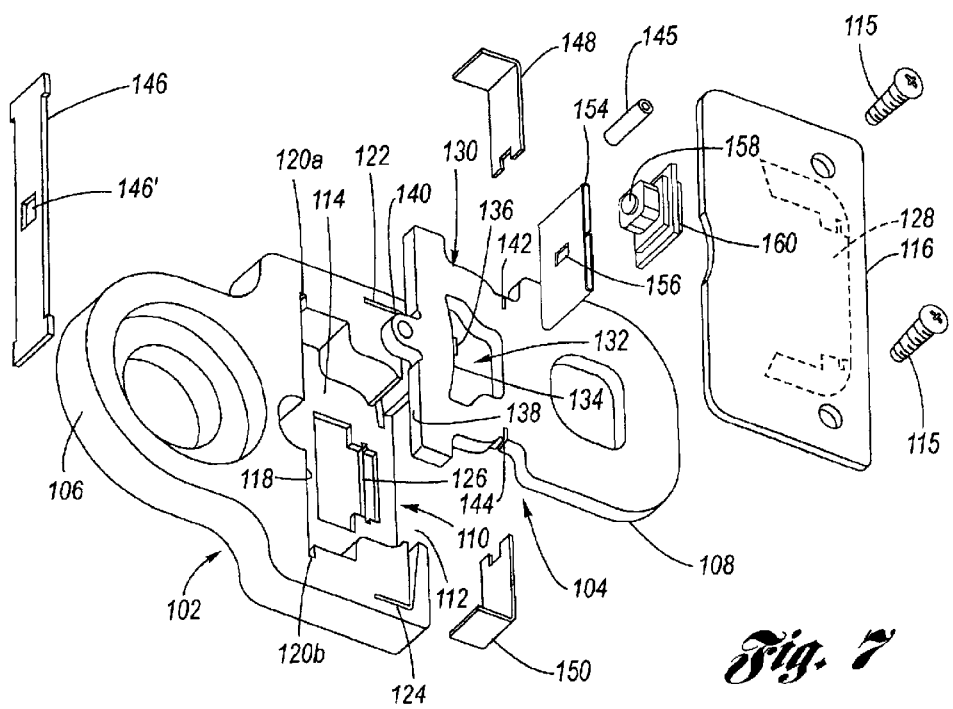
FIG. 7 is an exploded, perspective view of the seat belt tension sensor package of FIG. 4.

Referring next to FIGS. 6 and 7, component details of the seat belt tension sensor package 100 will be described, wherein the first and second housing components 102, 104 are preferably composed of high strength steel. Further to this discussion, a coordinate convention (see FIG. 6) with respect to the seat belt tension sensor package 100 will be adopted, wherein an axial axis Z coincides with axial tension forces of the first and second housing members 102, 104, and wherein components of tension force along the X and Y axes constitute off axis loads.

Axially opposite the seat belt interface (for example base 106) of the first housing member 102 a receptacle cavity 110 is formed therein (see FIG. 7). The receptacle cavity 110 includes a mouth 112, and is defined by a floor 114 and a selectively removable cover 116, as for example via threaded fasteners 115 holding the cover to the first housing member. Adjacent a blind rear end 118 of the receptacle cavity 110, are a pair of opposed rearward leaf spring slots 120*a*, 120*b*. Adjacent the mouth are first and second forward leaf spring slots 122, 124. The floor 114 and the cover 116 are each provided with a sensor mount cavities 126, 128.

The second housing member 104 has a nose 130 axially opposite its seat belt interface (for example the belt tongue 108) which is configured to be seatably received by the receptacle cavity 110. The nose 130 has a sensor aperture 132 formed therein, wherein a forward end 134 thereof includes a biasing spring mounting feature 136. The forward end 138 of the nose 130 includes a pin mounting feature 140 having a hole through which is affixed a pin 145. A pair of first and second nose leaf spring slots 142, 144 are formed in the nose 130 at a generally medial location rearward of the forward end 138.

A rearward leaf spring 146, having a generally elongated rectangular shape and composed of a spring material, such as a stainless spring steel, fits at its ends 146*a*, 146*b* respectively into the rear leaf spring slots 120*a*, 120*b* of the first housing member 102. An aperture 146' is formed medially in the rearward leaf spring 146 which is dimensioned to receive therethrough the pin mounting feature 140.

A first leaf spring 148, also composed of a spring material (ie., a stainless spring steel), is received into the first forward leaf spring slot 122 and the first nose leaf spring slot 142. A second leaf spring 150, also composed of a spring material (ie., a stainless spring steel), is a received into the second forward leaf spring slot 124 and the second nose leaf spring slot 144. For mechanical anchorage purposes, it is preferred for the first and second forward leaf spring slots 122, 124 and for the first and second leaf springs 148, 150 to be generally L-shaped, wherein the base B of the "L" serves as anchorage. Further, in that the first and second housing members 102, 104 are relatively movable, the first and second forward leaf spring slots 122, 124 have a rearward wall 152 which has a finite acute angle with respect to the X axis predetermined to allow for free flexing of the first and second nose leaf springs as the first and second housing members move between the first and second relative positions.

A biasing spring 154 has a connection feature 156 which interfaces with the biasing spring mounting feature 136 to attach the biasing spring to the forward end 134 of the sensor aperture 132. A pressure sensor 158, as for example a sensor described in aforementioned and herein incorporated U.S. Pat. No. 5,661,245, available through SenSym, Inc. of Milpitas, Calif., is mounted to a sensor base 160. The upper and lower edges of the sensor base 160 interfit with the sensor mount cavities 126, 128 to thereby solidly affix the sensor 158 to the first housing member 102.

Finally, it will be noted that the contour of the axial cavity sidewalls 162 of the receptacle cavity 110 are generally complementary to the contour of the axial nose sidewalls 164 of the nose 130. In this regard, the axial nose sidewalls and axial cavity sidewalls cooperate to allow for axial movement with a small clearance of the first housing member 102 relative to the second housing member 104 only between the first relative position and the second relative position, as will be discussed hereinbelow with respect to FIGS. 8A and 8B.

FIG. 8A depicts the seat belt tension sensor package according to the present invention wherein the first and second housing members 102, 104 are at the first relative position, characterized by a relaxed state of operation in which tension between the first and second housing members 102, 104 is substantially zero. It will be noted that the rearward leaf spring 146 and the first and second leaf springs 148, 150 are in relaxed spring states. The biasing spring 154 applies a predetermined initial spring load onto the sensor 158, the counterbalance of which is taken up by the nose to the blind rear end 118 (the rearward leaf spring 146 being sandwiched therebetween). A movement stop in the form of axially facing abutments 166, 168, respectively, of the axial cavity sidewalls 162 and the axial nose sidewalls 164 are separated at the first relative position by a small predetermined distance which defines the allowed axial movement of the first housing member 102 relative to the second housing member 104 (ie., the distance between the first relative position and the second relative position), as for example 0.04 inches.

FIG. 8B depicts the seat belt tension sensor package according to the present invention wherein the first and second housing members 102, 104 are at the second relative position, characterized by a flexed state of operation in which tension between the first and second housing members 102, 104 is of a predetermined magnitude. This predetermined magnitude is the highest reasonable range of loading for the sensor under operative conditions, as for example the predetermined biasing plus the applied axial tension force, less the axial flex force of the rearward leaf spring and the first and second leaf springs. It will be noted that the rearward leaf spring 146 and the first and second leaf springs 148, 150 are in flexed spring states. The biasing spring 154 applies a second predetermined spring load onto the sensor 158. Axially facing abutments 166, 168, respectively, of the axial cavity sidewalls 162 and the axial nose sidewalls 164 are now in axially abutting contact, whereupon any increase in tension force applied to the first and second housing members is taken up entirely by the axially facing abutments 166, 168.

Because the suspension system 170 constitutes leaf springs 146, 148, 150, frictionless, free flexibility is provided in the axial direction along the Z axis, but there is very high resistance to any flexing along non-axial directions having components along the X or Y axes (that is, the suspension system freely flexes parallel to the Z axis and is very stiff normal to the Z axis in response to cross axis loads). Accordingly, the movement of the first and second housing members 102, 104 is substantially immune to cross axis loading In operation, as axial tension force is applied to the first and second housing members 102, 104, the first and second housing members move relative to each other in a frictionless manner, via a mutual suspension system 170 characterized by the rearward leaf spring 146 and the first and second leaf springs 148, 150. As the first and second housing members relatively move, the biasing spring 154 increasingly compresses against the pressure sensor 158, thereby causing the sensor signal output to change with the compression, and thereby, with proper pre-ascertained signal processing, provides a signal indicative of the axial tension force between the first and second housing members.

FIG. 9 depicts a graph of signal output of the pressure 158 with respect to axial tension force applied to the first and second housing members 102, 104. The signal can be a voltage, a current, or if needed, a digital signal using a specified protocol. The electrical parameter chosen will be dependent upon environmental considerations. For example, the signal output may be an analog voltage, ratiometric to the power supply voltage and range from 0.5 volts DC through 4.5 volts DC for full scale. The fundamentals of this transfer function consists of a zero signal (0.5 volts), a full scale signal (4.5 volts), as well as the span (4.0 volts). If the electrical measurement is to be made using a current output signal, then a typical 4 milliamp would be zero, full scale would be 20 milliamp, and have a span of 16 milliamp.

In the event of an untoward incident (as for example a crash), the axial tension force would exceed the mechanical limits of the affixment of the sensor base; however, this situation can never happen by virtue of abutment of the axial facing abutments 166, 168 prior to approaching this mechanical limit. Table It gives an exemplar range of operational expectancies.

TABLE II

| Belt Load Range (lb.) | BTS error including: Linearity, Hysteresis, Repeatability Zero, and Span errors including Temperature Effects. (ERMS) | Number of Mechanical Cycles Typical/ Design Intent | Comments | Sensor Output Volts |
|---|---|---|---|---|
| 0–5 | BTS error shall be < 10% FS | 50,000/200,000 | Normal Use | 0.5–1.1 |
| 5–10 | BTS error shall be < 10% FS | 7000/25,000 | Normal Use | 1.1–1.8 |
| 10–30 | BTS error shall be < 10% FS | 2500/8000 | Child Seat or Infant Carrier | 1.8–4.5 |
| 30–60 | BTS error shall be < 25% FS | 1000/8000 | Child Seat or Infant Carrier, Occupant Jounce Loads | 4.5—4.5 |
| 60–250 | BTS shall not malfunction after exposure | 100/2500 | Large occupant Jounce Loads, Light Impact Loads | 4.5—4.5 |
| 250–1250 | BTS shall not malfunction after exposure | 3/25 | Large occupant Jounce Loads, Light, Impact Loads | 4.5—4.5 |
| >1250 | BTS shall not malfunction after exposure | 1/2 | Light to Moderate Crash/Impact Loads | 4.5 |

General considerations regarding the sensor 158 will now be detailed. The preferred pressure sensor 158 consists of a silicon micro-machined pressure transducer chip with a nominal pressure rating of 2500 psi. This pressure rating relates to the allowable micro-strain that the sensor chip can withstand under normal linear conditions. The pressure sensor mechanism is designed to collect the force exerted onto its surface axially by the biasing spring 154 in response to application of an axial tension force to the first and second housing members 102, 104. This causes localized strain within the pressure sensing chip. Implanted into the silicon pressure sensor are a series of piezoresistors. These resistors change resistance under strain, and the circuit arrangement is a classical wheatestone bridge. The change in resistance causes a change in bridge differential output voltage. A detailed explanation of a suitable pressure sensor is described in aforementioned and herein incorporated U.S. Pat. No. 5,661,245.

To those skilled in the art to which this invention appertains, the above described preferred embodiment may be subject to change or modification. For example, while the present invention has been described in an automotive seat belt environment of operation, the sensor package according to the present invention is not so operationally limited, in that can be used in any other operational environment, the foregoing automotive environment being merely presented herein as exemplary. Such change or modification can be carried out without departing from the scope of the invention, which is intended to be limited only by the scope of the appended claims.

what is claimed is:

1. A sensor package for sensing axial tension, comprising:
a first housing member that has a receptacle cavity;
a second housing member that has at least a portion that moves within said receptacle cavity;
a suspension system movingly interfacing said first housing member with respect to said second housing member, wherein said first and second housing members are relatively movable along an axis, and wherein the movement along the axis is substantially frictionless;
a movement stop connected with said first and second housings, said movement stop defining a range of movement along the axis of said first housing member relative to said second housing member via said suspension system between a first relative position and a second relative position, said movement stop prevents said second housing from being pulled from said receptacle cavity of said first housing member under a tensile force; and
a sensor located on one of said first and second housing members, said sensor sensing tension force between said first and second housing members between said first relative position and said second relative position.

2. The sensor package of claim 1, further comprising a biasing spring connected to the other of said first and second housing members which is free of said sensor, wherein said biasing spring abuts said sensor such that said biasing spring compresses against said sensor parallel to the axis in response to movement of said first housing member relative to said second housing member.

3. The sensor package of claim 2, wherein said biasing spring applies a reduced force proportional to the tensile force applied to said first and second housing members.

4. The sensor package of claim 3, wherein said sensor measures the force produced by said biasing spring.

5. The sensor package of claim 2, wherein said biasing spring prevents direct loading of said sensor after said movement stop prevents movement of said second housing member relative to said first housing member.

6. The sensor package of claim 5, further comprising:
a rearward leaf spring attached at each end to one of said first and second housing members, and interfaced medially to the other of said first and second housing members;
a first leaf spring attached to each of said first and second housing members; and
a second leaf spring attached to each of said first and second housing members at a location opposite said first leaf spring.

7. The sensor package of claim 6, wherein said first and second leaf springs are L-shaped, wherein said first and second leaf springs are each anchored into one of said first and second housing members via a respective L-shaped slot, and wherein each said L-shaped slot has an acutely angled rearward wall for accommodating flexing of the first and second leaf springs as the first housing member moves along the axis with respect to said second housing member.

8. The sensor package of claim 7, wherein said second housing member has a nose which is received in said receptacle cavity.

9. The sensor package of claim 8, wherein:

the ends of said rearward leaf spring are connected to said first housing member adjacent a forward end of said receptacle cavity, and said nose is medially interfaced with said rearward leaf spring;

the first and second L-shaped slots are located adjacent a rearward end of said receptacle cavity at opposing sides thereof;

said nose has a sensor aperture, said biasing spring being mounted to said nose at said sensor aperture; and said sensor is mounted to said first housing member and located in said sensor aperture.

10. A sensor package for sensing axial tension, comprising:

a first housing member that has a receptacle cavity;

a second housing member that has at least a portion that moves within said receptacle cavity;

a suspension system movingly interfacing said first housing member with respect to said second housing member, wherein said first and second housing members are relatively movable along an axis;

a movement stop connected with said first and second housings, said movement stop defining a range of movement along the axis of said first housing relative to said second housing via said suspension system between a first relative position and a second relative position;

a sensor located on one of said first and second housing members, said sensor sensing tension force between said first and second housing members between said first relative position and said second relative position, said movement stop prevents said second housing from being pulled from said receptacle cavity of said first housing member under a tension force; and a biasing spring connected to the other of said first and second housing members, wherein said biasing spring abuts said sensor such that said biasing spring compresses against said sensor parallel to the axis in response to movement of said first housing member relative to said second housing member.

11. The sensor package of claims 10, wherein said biasing spring applies a reduced force proportional to the tensile force applied to said first and second housing members.

12. The sensor package of claim 11, wherein said sensor measures the force produced by said biasing spring.

13. The sensor package of claim 12, further comprising:

a rearward leaf spring attached at each end to one of said first and second housing members, and interfaced medially to the other of said first and second housing members;

a first leaf spring attached to each of said first and second housing members; and a second leaf spring attached to each of said first and second housing members at a location opposite said first leaf spring.

14. The sensor package of claim 13, wherein said first and second leaf springs are L-shaped, wherein said first and second leaf springs are each anchored into one of said first and second housing member via a respective L-shaped slot, and wherein each said L-shaped slot has an acutely angled rearward wall for accommodating flexing of the first and second leaf springs as the first housing member moves along the axis with respect to said second housing member.

15. The sensor package of claim 14, wherein said second housing member has a nose which is received in said receptacle cavity.

16. The sensor package of claim 15, wherein:

said rearward leaf spring has ends that are connected to said first housing member adjacent a forward end of said receptacle cavity, and said nose is medially interfaced with said rearward leaf spring;

the first and second L-shaped slots are located adjacent a rearward end of said receptacle cavity at opposing sides thereof;

said nose has a sensor aperture, said biasing spring being mounted to said nose at said sensor aperture; and said sensor is mounted to said first housing member and located in said sensor aperture.

17. The sensor package of claim 10, wherein movement of the first housing member relative to the second housing member is substantially frictionless.

* * * * *